United States Patent [19]

Corey et al.

[11] Patent Number: 5,015,317

[45] Date of Patent: May 14, 1991

[54] METHOD AND APPARATUS FOR MAKING A MULTI-CELLULAR COLLAPSIBLE SHADE

[75] Inventors: John A. Corey, Melrose; John T. Schnebly, Rensselaer, both of N.Y.

[73] Assignee: Comfortex Corporation, Cohoes, N.Y.

[21] Appl. No.: 287,740

[22] Filed: Dec. 22, 1988

[51] Int. Cl.[5] .............................................. B32B 31/12

[52] U.S. Cl. .................................... 156/197; 156/199; 156/204; 156/350; 156/366; 156/474; 160/84.1; 425/368; 493/413; 493/418; 493/450

[58] Field of Search .............. 156/197, 204, 474, 462, 156/459, 461, 87, 286, 205, 199, 366, 350; 428/116, 118; 160/84.1; 425/336, 368, 369; 493/413, 418, 450, 451; 162/280; 414/594, 610, 612, 613, 662

[56] References Cited

U.S. PATENT DOCUMENTS

| | | | |
|---|---|---|---|
| 2,556,011 | 6/1951 | Swayze et al. | 428/188 |
| 3,164,507 | 1/1965 | Masuda | 156/197 |
| 3,166,456 | 1/1965 | White et al. | 156/197 |
| 3,301,729 | 1/1967 | Kauffman | 156/197 |
| 3,655,475 | 4/1972 | Stelling, Jr. et al. | 156/197 |
| 3,759,507 | 9/1973 | Imbrecht | 493/413 X |
| 3,770,549 | 11/1973 | Carbone | 156/197 |
| 4,019,554 | 4/1977 | Rasmussen | 160/84 |
| 4,288,485 | 9/1981 | Suominen | 428/116 |
| 4,307,768 | 12/1981 | Anderson | 160/84 |
| 4,347,887 | 9/1982 | Brown | 160/368 R |
| 4,450,027 | 5/1984 | Colson | 156/193 |
| 4,500,380 | 2/1985 | Bova | 156/204 |
| 4,612,225 | 9/1986 | Graffam et al. | 428/116 |
| 4,732,630 | 3/1988 | Schnebly | 156/197 X |
| 4,798,575 | 1/1989 | Siversson | 156/474 |
| 4,807,686 | 2/1989 | Schnebly et al. | 160/84.1 |

FOREIGN PATENT DOCUMENTS

| | | | |
|---|---|---|---|
| 865813 | 4/1961 | United Kingdom | 156/197 |

*Primary Examiner*—Michael W. Ball
*Assistant Examiner*—Michele K. Yoder
*Attorney, Agent, or Firm*—Dykema Gossett

[57] ABSTRACT

A machine (300) and the process for manufacture of a unique completely pleated product (110) which is made from a continuous, flexible web (311) for the covering of windows and the like. The machinery consists of a production line (300) with at least a screen printing assembly (306), printing phase control apparatus (330), a unique pleating assembly (400) and a folding assembly (500) for stacking and receiving the final product, screen printing and web travel phasing is performed in accordance with standard practices in the industry, while the pleating and folding of the finished product is performed by apparatus designed and constructed by the instant inventors. After predetermined patterns of adhesive or bonding material (212) have been applied to the continuous web (311), it is pleated by a paired roller assembly (400) and, through the use of an air knife assembly (500), folded into a collecting apparatus. The finished product (110) is a completely pleated structure consisting of front and rear pleated faces containing, interstitially, a multi-cellular structure. The finished product realizes a flexible, shading structure which can be compactly collapsed, revealing essentially none of the pleated surfaces. The finished product derives its uniqueness primarily from the fact that it is pleated from a single continuous web and that retroflexing of the web comprises complete folds in, or pleating of, the web.

12 Claims, 9 Drawing Sheets

METHOD AND APPARATUS FOR MAKING A MULTI-CELLULAR COLLAPSIBLE SHADE

BACKGROUND OF THE INVENTION

1. Field of the Invention

This invention relates to shades, fenestration treatments and the like and, more particularly, to flexible sheet structures which comprise collapsible, multi-celled curtains or planar coverings. Such multi-celled structures are generally used as moveable window shading and combine the art of planar coverings with that of honeycomb and similar structurings.

2. Discussion of the Prior Art

The prior art discloses various means for and methods of making multi-celled, collapsibly-flexible sheet structures. One of the earliest attempts to create such a structure was disclosed in patent U.S. Pat. No. 4,019,554, issued to Rasmussen in 1977. Rasmussen's invention comprises a plurality of superimposed, one-directionally arranged tubular members with a common slat-like partition, resembling the slat of the common Venetian blind, between each pair of adjacent tubular members. Each of the tubular members, which could be formed from a semi-rigid flexible fabric or material, has a folding crease along its two opposite sides; such a crease allowing the collapse of each individual tube and thereby permitting the entire structure to collapse in the manner of a Venetian blind. Rasmussen titled his invention THERMAL INSULATING CURTAIN, ESPECIALLY FOR USE IN GREENHOUSES. Thus, the inventor clearly taught the use of a flexible, multi-celled and collapsible sheet structure for the purposes of maintaining an insulative layer between two differing climatic environments. Aesthetically, the invention can be said to have been pleasing to the eye but, from a truly functional point of view, it lacked a mechanical holism that would have allowed its usage in not only greenhouse structures of the day but the greenhouses, sunrooms, and atriums of the next four or five decades. Rasmussen failed to provide the means whereby a multi-celled, collapsible and flexible sheet structure could be made to extend over non-vertical surfaces, especially as disclosed in the more sinuous designs of today's glazing architecture.

Before the aforementioned mechanical flexibility could be acquired in an invention such as the instant, a certain evolution had to take place. The tube-like cells of the Rasmussen invention would have to become more flexible, more homogeneous (i.e., the rigid slat would have to be removed), and become more easily produced, at less cost and by a less labor-intensive method of manufacture. Concomitant in this evolution would have to be the development of greater aesthetic character, for future shades would not only have to provide increased flexibility and versatility, as well as environmental utility but, since the new operational environment would be office and home use, they would have to be quite attractive. Thus began the development of what is commonly referred to as honeycomb shade structures.

In 1965, a patent was issued to A. Masuda, U.S. Pat. No. 3,164,507 for a Method of Making Cylinders for Raising and Transplanting Seedlings of Farm Crops. Masuda taught method for making honeycomb planters, that is, an array of tubular, hexagonal shells that comprised a plurality of individual tubules glued and stacked in a stylistic fashion which, when expanded by drawing apart the upper and lower margins, formed a multi-cellular array which was almost identical to the natural honeycomb structure, yet retained its collapsible character. Masuda began With an elongate strip of suitable fabric and folded the lengthwise lateral edges towards the center longitudinal axis of the fabric strip. The folds were made at slightly more than one third of the strip width, thereby mandating a slight overlap of the lateral margins as they were folded towards the longitudinal center. At the point of overlap, an adhesive was laid down on the outside margin of the first folded panel and the second folded panel was overlaid the adhesive margin. Thus, when opened, one observed a simple paper tube. Thereafter, a desired number of tubes were, in their folded configuration, laid parallel on a horizontal surface with a spacing between the margins of approximately one third the width of each folded tube. An adhesive strip was placed along the top side of the lateral margins of the tubes with the exception that no strip was placed on what were (preselected) outer margins of the structure. A second layer of folded tubes was then placed parallel to the bottom layer so that the lateral margins of each of the upper tubes overlapped and were superimposed above the adjacent glue strips of the lower level tubes. This created a series of spaced, parallel tubes at one level with the same array on the next upper level, but offset by about one-third tube width from the layer or level immediately below it. The next level up was then placed over the original level in parallel alignment with the second, thereby creating an alternating stacking of folded tubes, each level cojoined to the one above and below it at the lateral margins of each tube, overlapping approximately one third at each lateral margin. When the array was opened, the result was a honeycomb structure comprised of myriad, adjoined hexagonal cells, the hexagonal shape being acquired by the deliberate overlapping and cojoining of two thirds of each tube. Thus, in the completed array, only two sides or one third of the total sides of each hexagonal shell were not rigidified by the stiffended adhesion to another cell. Although this method of making cylinders for transplanting seedlings served the inventor's purposes well, such an array would be far too inflexible to serve as a shade. Another disadvantage to the Masuda method of preparation would be the loss of light transmissivity and the unlikelihood of using more than a one-cell construction of the Rasmussen character, both because of the excessive amounts of adhesive used. That the product of Masuda lacks aesthetic character derives perhaps because the inventor wished only to transplant seedlings of farm crops.

The 1980's ushered in an era of innovation relative to honeycomb insulating materials. Relative to shade structures, the simple pleated shade, because of its appearance and similarity with the externally facing portions of a honeycomb structure may have inspired the concept of employing the honeycomb or multicellular array as an adjunct to the pleated shade. Quite apparently, the Rasmussen invention could be characterized as an ordinary Venetian blind over which one has laid, both front and back, a pleated shade and glued the troughs of the pleats to the front and rear edges of the slats. Dwelling for the moment on the simple pleated shade, there is realized in its embodiment a very inexpensive device, since it is readily made from a single continuous sheet of material. Unfortunately, the simple pleated shade invariably requires an unattractive visible mechanism, usually in the form of cords through the pleats, in order to actuate its movement. The stored mode for this device is very compact because the pleated material folds up to a closely-stacked dense pile. But, the insulating value of this design is very low, as the sheet in which the pleats are made must be necessarily thin and flexible; thus, a single layer of such material does not provide much conductive or convective barrier against an undesirable climatic environment. Further, when cords are used to guide and move the pleats, the holes through which the cords pass become direct leakage paths across the insulation. Relative to their use as coverings to span a non-vertical opening, such flexible pleats rarely have the instrinsic stiffness required for such usage.

In September 1982, a patent issued to L.P. Brown, U.S. Pat. No. 4,347,887, disclosing a method of bonding a continuous web to itself at predetermined locations, to acquire upon expansion, a cellular structure consisting of a double row of rectangular cells, one row staggered from the other. The bonding septa of the row configurations are approximately one fourth to one half of a fold width wide and are of uniform width, to assure that the outward facing panels of Brown's resulting shade are parallel. The parallel outer surfaces, along with the coplanar inner surface of the cell array, comprise a triple glazing type of insulative array. The bonding or glue lines are clearly visible between the cell structures and the resultant product, having wide glue lines, is inflexible normal to the plane, so that its use in curvilinear operations is practically nil.

Considering now a later structure, and one more closely related to the instant invention, an expandable honeycomb material is constructed from a plurality of cellular tubes bonded together along their edges to form collapsible panels. Such an invention is disclosed in U.S. Pat. No. 4,450,027 issued to W. Colson, which is only reminiscent of the Masuda invention. The Colson invention improves greatly on the insulating value of the simple pleated design by providing, in effect, two such pleated shades back-to-back as was suggested by Rasmussen. The entrapment of air in the resulting tubular cells (between the faces of the structure), provides an effective barrier to conductive and convective heat transfer. Hereinafter, when the reader encounters the drawings of the instant application, notice may be taken of the exposition of Colson's cellular array at FIG. 1. Therein the reader will observe that the internal space (between the faces of the cellular structure) is effectively divided by ligaments at the cell boundaries. These ligaments, constituting the tube-contacting surfaces comprised of material and adhesive, provide a place for passing therethrough the actuating cordage or guide blades associated with deployment of the invention. By piercing only the ligaments, such cordage or guide blades may be passed through the area (corresponding to the slat partitions of Rasmussen) hidden from view and avoiding the reduction and insulating quality of the structure such as would be suffered by piercing either of the pleated faces. Such actuating means, as well as other similar means, are well-known in the art and employed extensively in Venetian Blinds. The Colson honeycomb design has the advantages of high aesthetic appeal but has only moderate thermal effectiveness. Also, the Colson design has a limited bond area that limits its structural stiffness, a factor required for spanning non-vertical openings.

Lastly, in this discussion of prior art and the derivative chain of ideas, as well as disadvantages, which lead to the instant invention, is the invention disclosed in U.S. Pat. No. 4,307,768, issued to J. Anderson. This design, of an expandable honeycomb material, is one of the first truly honeycomb structures applied to window treatments and, although it precedes Colson, is a departure from such single-celled art. It is constructed from a number of individual flat sheets of flexible material attached to one another in a stack by applying alternate lines of bonding agent (such as glue) between the stacked sheets such that the bonding agent lies in parallel lines on each sheet. The pattern of bonding lines is offset on every other sheet by one-half the line spacing distance. This provides an alternating pattern of lines through the stack of sheets, also reminiscent of Masuda Who used a one-third alternate spacing and acquired hexagonal cells, which causes the sheets to flex when the top and bottom sheets of the stack are pulled apart from one another (as in Masuda). The flexing creates a number of internal tubular cells, a honeycomb, that will hereinafter be seen at FIG. 2. For comparison at this time, FIG. 2A is provided showing the stacking and gluing arrangement of Masuda. This prior art is taken directly from the Masuda disclosure. The Anderson structure provides some thermal advantage over that previously described by providing for multiple cells through the thickness of the shade structure. Unfortunately, there is provided no improvement in the manufacturability of the Anderson design because it still requires the bonding of a number of individual elements (the sheets) to form the final product. An overwhelming aesthetic disadvantage to the Andersen product is the presence of the sheet raw edges (and the bonding lines) on the faces of the structure that cannot go unnoticed. Advantageously, the multi-celled depth provides a high degree of intrinsic stiffness for spanning non-vertical openings, and the internal ligaments (such as observed in the Colson invention) provide hidden locations for actuation and guidance means. Anderson, in his teaching of lateral guide blades to afford means of guidance over which the honeycomb structure slides, passes the guide blade through the ligament array and claims an advantage of such ligaments in acquiring an improved edge sealing of the structure by virtue of the twisting of the ligaments as the structure is expanded. Anderson teaches that, when a slot of a certain width is cut into the ligaments, so that the guide blade may reside therein and pass therethrough, slot edge contact made by the ligament and the blades effects a more complete sealing. Unfortunately, Anderson does not address the particular concern of the binding that must result when the contact between ligament and guide blade occurs. Such binding can prevent the full and uniform deployment of the structure and lead to premature wear and failure. Such a disadvantage, noticeable in vertical deployment of such a shade, can prove disastrous when one takes the shade to a non-vertical, dynamic operation. Should the deployed shade remain static in a non-vertical posture, deformation of ligament edges will surely result with a loss of not only aesthetic appeal, but a good deal of the environmental seal that Anderson forecasts in the use of his invention.

That there exists a demonstrable need to provide for insulation of thermal openings, such as windows in buildings, can no longer be refuted. However, the vast majority of the applications require that the insulation be removable from time to time to provide for the admission of solar radiation and to allow an unobstructed view. Provision for such removal must be convenient and highly compact of storage, or the solution will be rejected by operators who will choose to leave the insulation in either the closed condition (thus defeating the purpose of the fenestration opening as to view) or in the open condition (thus defeating the purpose of the desired insulation). Further, since most such fenestration openings are in residential dwellings or workplaces where aesthetic conditions must be observed, it is essential that any proposed solution to the insulation problem provide for an attractive appearance in both the open and closed condition or, no matter how effective thermally, such a solution will not be implemented in a large number of sites where its insulating function is desirable. Contemporary use of proposed insulation mandates its provision at as low a cost as possible with greatest flexibility for use in varied thermal environments. The structure must be self supporting, consistent with its mobility so that it may be applied to non-vertical thermal openings, such as skylights or greenhouse structures. The instant invention provides all of the desirable characteristics described above, and successfully avoids the disadvantages of the prior art, even to the extent that, when fully collapsed, it presents minimal surface area susceptible to soiling.

SUMMARY OF THE INVENTION

The instant invention provides for a shading and insulating structure which is movable and collapsible for storage, while providing a high degree of thermal effectiveness when deployed. The structure is aesthetically pleasing, inexpensive to manufacture, and easily adaptable to known means of actuation and guidance for both vertical and non-vertical applications. Most importantly, by employing the proper guidance techniques, the actual applications range from true vertical to true horizontal placements, to compound arrangements of both.

The structure consists of a continuous sheet of flexible material, which may range from transparent to opaque (depending upon the requirements of the application), and is herein after termed the web or webbing. The web is pleated according to a new and unconventional practice, which creates permanent folds in the material at regular intervals, in alternating directions so that the material, properly constrained, may be made to collapse easily and preferentially into a compact stack with little enclosed space and no pleat face exposure. Bonds between adjacent folds of the pleated material are then formed, either by homophilic means (such as welding), or heterogeneous means (such as the pre-fold coating with stripes of adhesive or bonding agents) along lines parallel to and equidistant from both sides of the pleats, i.e., transverse to the run or the length of the webbing. As would now be apparent to one of ordinary skill in this art, the location of the adhesive stripes and the number of such stripes applied to each fold, as well as their width, determines the resulting multicellular structure. For the sake of brevity, only two such structures shall now be described.

Starting with the dispensing of a rolled planar web, an adhesive stripe is first laid down transverse the web length (or parallel to a fold line index), at approximately three quarters of the way outward from the interior of proposed fold, therefore, approximately a quarter of the way toward the adjacent and opposing fold (similarly indexed). The bonding (adhesive stripe contact) line would have the effect of closing off a cylinder defined by the fold and the two opposing sides of the pleat that are joined by the glue or bonding line. The next adhesive stripe is laid down in the same manner with reference to the next adjacent (and opposing) fold. This process is repeated on both sides throughout the entire stack of pleats formed in the web run utilizing adhesive stripes of thin, uniform width and having a pleat-to-bond line width ratio of about 10:1. The alternation of the stripes on each is such that between every two stripes there is placed a fold. More appropriately, a pair of adhesive stripes straddles a fold. When such a stack is expanded by moving the furthermost pleats away from each other, a curtain with multi-cellular infrastructure is formed, consisting of a stack of foldable quadrilateral-cell structures that present external surfaces having the "pleated fabric" appearance on both faces.

A second structure, which results in the multi-cellular effect, is obtained by placing not one adhesive stripe, but two, between the folds of a pleat and on each side of the web. As with the first arrangement, an adhesive stripe is laid down approximately three quarters or more of the width of the pleat from a fold which is established as the reference fold. Between the reference fold and this stripe, another bonding line is then laid down. As the pattern is moved to the next adjacent pleat and to the second reference fold, it is laid down in the same manner as the first, but it is off-set the distance corresponding to that between the initial stripe and the second reference fold. In short, the paired stripes will alternate from one pleat to the other in the same fashion that the singular stripe alternated from one pleat to another in the first example. When this pattern is folded, stacked in the accretion process and finally expanded, the result is a multi-cellular structure, the resulting external surfaces being pleated in much the same manner as the first-described stack type, on both faces of the curtain. The distinct advantage of the multi-cellular structure being, of course, that greater depth is lent to the invention, by formation of an additional layer of air cells between front and rear faces of the resulting panel; and a concomitant higher insulative factor is attained, as well as a greater structural strength to span wide expanses in non-vertical applications. Later in this disclosure, the aforementioned structures will be discussed in greater detail, with care being paid not only to the structures per se, but to the nomenclature applied with this novel and compelling window treatment apparatus.

The method of stylistically pleat-folding a continuous web and coating that web with desirable materials, additional to the adhesive coatings, so as to acquire certain desirable characteristics (such as reflective character) shall now be discussed. The method of laying down the various coatings, including the adhesive stripes, is carried out by the use of an unique apparatus devised by the instant applicants for the sole purpose of constructing multi-cellular honeycomb panels from a continuous length of webbing material. The hues and coloring media are susceptible of full cure (thermal cure is utilized, but not obligatory), while the adhesive or bonding material is amenable to partial cure, a final cure performed sometime subsequent to the coating operations.

In order to mechanize the method of manufacture, existing web treatment equipment has been utilized to the maximum extent possible. For example, rotary screen printers and coating and adhesive curing mechanisms have been employed and the use of such existing machinery has been optimized in the fabrication plant which is used to realize the instant multi-cellular, collapsible window treatment.

Initially, web is cast off from a supply roller, which metes out the web at a controlled rate. Next, the webbing encounters a tensioner mechanism just prior to entering the first screen printing machine. As the pretensioned web sheet is introduced to the first screen printing mechanism, various coatings and/or laminations, to effect color and hue, as well as reflecting characteristics, are laid down on one or both sides of the web fabric. Immediately thereafter, the web is introduced to the first curing station where the coatings providing color, insulation, reflection etc. are subjected to a full cure which reduces the porosity of the web fabric. After coatings have been applied and cured by one or more such coating and curing stations, the web is passed to the second or final screen printing station which applies adhesive stripes, transverse the web fabric, in proper and precise relationship (registry) with the coating scheme. Also provided is detection means according to known art, that is, means which affords the process controller data relative to the phase relationship between discrete coatings (and adhesive stripes) and the transverse folds (or pleats) which are to effect partially the physical geometry of the desired product. Such phase detection means is located downstream in the web treatment process immediately following the partial cure process afforded by the last (adhesive stripe) curing station. The partial curing process assures that the adhesives will be adequately cured to remain nontransferable to the equipment but still capable of bonding to a (target) surface when the web is folded.

After passing the last curing station and having applied coatings in the requisite state of cure, the web passes between a pair of pleating rollers which, by design, perform alternately as a creasing roller and a nip roller. By means described later, these pleating rollers also cooperate with the phase detection means to assure correct registration between the coating with adhesive patterns and the pleat folds. Exiting the pleater, the web having been folded first in one direction, and then in the other, enters the folding station. The folding station comprises an air knife pair and batcher box. The first, the air knife pair, consists of a pair of counter-rotating air knives positioned in transverse registry to the web, with one on each side thereof. Each air knife provides a continuous forceful stream of air transverse the folded web and is phased, in its rotation, so as to initially engage the web proximate a fold line which corresponds to a trough, relative to that particular air knife. As the knife rotates, the air stream engaging proximate the trough urges the trough toward the far side of the batcher box, while the opposing knife urges the preceding crest toward the near side (which is the far side for said opposing knife). With both air knives operating uniformly, in a predetermined phase relationship, the pleated web is urged into a pleat fold as it enters the batcher box. The batcher box, in turn, is under a partial vacuum which further enhances the folding, i.e. the pleating process by drawing the folded stack more tightly into the batcher box. Consequently, the web, having disposed thereon the desired, partially cured bonding line patterns, is physically folded into the requisite pleat array and, by its collection into a stack in the batcher box, is accreted into one of the two (or more) patterns taught hereinafter in this disclosure.

Having outlined the general process and the machinery for mechanizing the process, there remains discussion of the two significant pieces of apparatus which clearly remove the instant application from the realm of the ordinary. The first of these is the physical embodiment of the pleater, and the second is the folding station with its air knife-batcher modules.

The pleater comprises a pair of rollers having parallel axes of rotation and are moveably spaceable so that the cylindrical, circumferential surfaces of each are in line contact and rotationally phased registry with each other. The pleater rollers are identical to each other and are aligned within the web treatment apparatus so that the web fabric is taken between the rollers immediately after it passes the phase detector (registration control) means. Each roller comprises three concentric cylinders which are caused to rotate about sealed end bearings. These are fixed in a bearing pillow block which, on one roller, is further fixed on a slider block. At one end of each axle, an air pressure supply line is coupled through the bearing seal so as to afford controlled air ingress (axially) into the roller assembly. Moving outwardly of the concentric cylinder array (characteristic of each roller) are: a rigid foraminous hollow inner cylinder; and spaced therefrom, an intermediate cylinder. The intermediate cylinder is both flexible and air tight, is sealed to the ends of the cylinder array, and provides a bladder, intermediate the foraminous inner cylinder and the third cylinder. The third and outer cylinder is a resilient, elastomeric, open-ended covering for the cylinder array. A torque coupling pin, at a plurality of locations, transfixes the outer cylinder sealingly through the bladder, or intermediate cylinder, passing into the foraminous inner cylinder. The coupling engendered by the torque coupling pin is an angular (rotational) coupling and the pin is allowed a modicum of radial translation while it transfixes the outer and intermediate cylinders to the foraminous, rigid inner cylinder. Thus, the rotary motion of the inner cylinder is physically coupled, by the torque coupling pin, to the outer cylinder. As would appear intuitive to one versed in the art, variable air pressure is introduced into the inner cylinder, and allowed to pass through the foramens into contact with the intermediate cylinder or bladder. Since the bladder is sealed to the cylinder ends, variations in air pressure will cause it to flex radially and uniformly. This flexing is transmitted to the outer cylinder which, because of its resilience, is responsive thereto. The outer cylinder, in flexing, maintains its coupling with the rotatable inner cylinder and, because of the radial (but movable) capture of the torque coupling pin, freely flexes and moves in the radial direction. The ability of the outer cylinder to undergo controlled radial expansion or contraction gives this mechanism the unique capability of readily and continuously modifying the roller circumference and thereby the arcuate distance (or spacing) between ridges or other features that are placed thereon. Such flexibility is seen, and has been conclusively determined, to be a significant advance over the current art. To achieve the actual alternate creasing pattern which provides the aforementioned pleats, there is provided a plurality of longitudinal protrusions mounted on the outer circumferential surfaces of each roller; these protrusions are termed creasing ridges. Positioned so that they are parallel to the axis of roller rotation, the ridges are necessarily transverse the web run and, having an essentially triangular definition, are each capable of creating one transverse crease in the web fabric. The web, captured between both rollers, is nipped by one roller while the opposing roller presents a ridge, pressing it into the web and onto the surface of the nipping roller, thereby creasing the web in the desired direction. The ridges are spaced along the circumferential perimeter of each roller in the predetermined opposing registry to make the desired fold pattern for the web.

After the creased web passes out of the pleater and through the air knives of the folding station, the batcher box is used to collect the pleated and folded (collapsed) array. The batcher box comprises an elongate rectangular container, the bottom of which comprises a moveable plunger plate. The plunger plate may be controllably moved from proximate the opening margins, or lips of the batcher box, and fully recessed to the back or bottom thereof. The opening margins of the batcher are radiused outward, that is, the entrance of the batcher has no sharp edges or angularly defined margins that would cause the pleated web material to catch or hang up. As each pleat is caused to enter the batcher, at the urging of the second air knife, an electronic sensor at the lips of the batcher box detects and registers the presence of the fold crest, now clearly the pleat crest of the multi-cellular, pleated shade. Adjacent the electronic sensing means, is air evacuation means located in the perimeter of the batcher box opening. In this area of the batcher box, the air evacuation means furthers the folding process caused by the air knives and allows a much more regulated and consistent stacking and confinement of the pleats within the box. Further to the batcher assembly, air pressure is afforded on the opposite side of a plunger plate bottom (or base) against which the pleats are stacked. When first filling the batcher box, the plunger plate base is fully forward to receive the first or base pleat. Motion of the plunger plate toward the opening of the batcher box is constrained by a cable which is connected to a stepping motor. The stepping motor is responsive to the electronic sensor and thus, when the presence of a predetermined number of pleat folds (crests) or an excessive stack height (relative to the box) is detected by the electronic sensor, a controller directs the stepping motor to reel in the plunger plate restraining cable, and the plunger plate is drawn toward the base of the batcher box.

After a batcher box is filled, another batcher box is afforded to the folding station. The recently filled batcher box containing the fully accreted shade array requires additional curing and is therefore removed to a curing oven.

DETAILED DESCRIPTION OF THE PREFERRED EMBODIMENT

Figure 2:
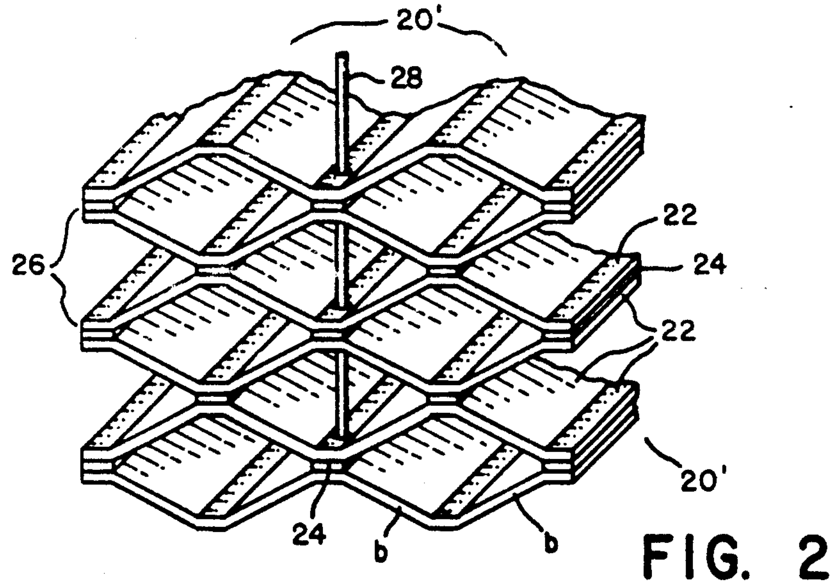
FIG. 2 PRIOR ART
FIG. 2 is an illustration of the prior art disclosed by Anderson.
Figure 2A:
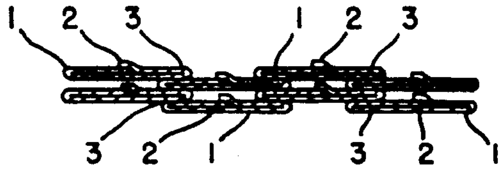
FIG. 2A PRIOR ART
FIGS. 2A and 2B are illustrations of the prior art disclosed by Masuda.
Figure 2B:
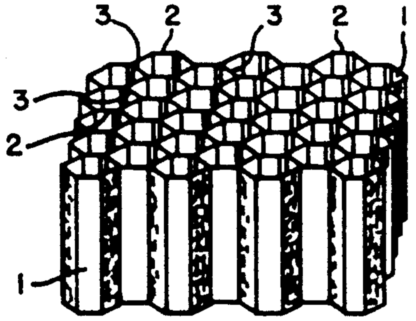
FIG. 2B PRIOR ART
Figure 1:
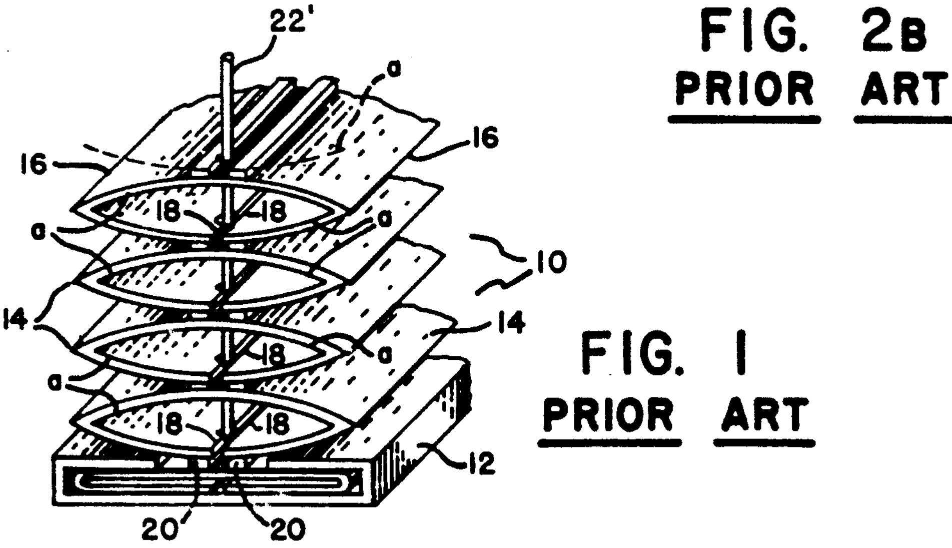
FIG. 1 PRIOR ART
FIG. 1 is an illustration of the prior art disclosed by Colson.

For years, honeycomb insulation sheeting consisted of steady evolution drawn from art such as that cited herein. With the advent of the honeycomb concept, however, a change took place in the art and, although trappings of the Rasmussen concept remained, the manufacture of multi-celled, collapsible, insulative arrays appeared to concentrate more on the gluing or bonding techniques used between fabric panels than on the folding of the panels into the desired pleated geometries. Referring more particularly now to FIGS. 1–2A, there are depicted therein illustrations of the prior art pertaining to Colson, Anderson and Masuda, respectively. FIG. 1 is an isometric illustration of the Colson single cell insulative shade 10. This invention is the single cell planar array that is always applied in vertical installations when used in its pristine form, as herein shown. All art depicted herein, including the instant invention, is (for the sake of clarity) displayed in vertical suspension. Continuing the discussion of the FIG. 1 illustration, beginning with an extruded sill 12, there is stacked one above the other a plurality of long tubes 14. With reference to the topmost tube shown in the FIG. 1 array, the reader may see that the tube 14 is formed, as described in the Summary of the Invention, by twice folding a long rectangular panel of the selected web along two lines 16 that are approximately one quarter of the way in from the longer side margins 18 of the rectangular panel. The margins 18 are brought into stand-apart registry and may, in fact, abutt one another. The margins 18, however, are not welded or joined. Further, although having the external definition of a tube, in that it may be opened provided the margins 18 are held together, no true tube or closed cell has been formed. This latter definition is acquired in the final assembly of this embodiment. After the folded panels have been prepared, a pair of longitudinal (i.e., parallel the margins 18) glue or adhesive stripes 20 are laid down on the outward facing surfaces of the folded "tubes" along the margin ends 18. Thereafter, and to the completion of the array, each "tube" is placed onto a stack, the first tube overlying the base 12. Each succeeding tube is laid down and the preceding tube will adhere to it as the adhesive or bonding stripes 20 cure. Once the assembly is complete and a topmost header, equivalent to base sill 12, is positioned atop the array (not shown), the rigid slats may be pulled apart, thus expanding and opening the single cell array.

For the sake of definition, a ligament is the portion of a pleat which comprises one of its two faces. Throughout this art form, ligaments are those portions of the fabric used to compose the cell network and shall be further defined by the placement of bonding lines or stripes relative to the fold lines, if such fold lines are intentionally created by the maker.

In FIG. 1, those portions of the panels defined by bond lines 20 and the crease or fold lines 16 are denoted as ligaments a. In the case of the Colson invention, all of the fabric is seen as pleat faces comprised of ligaments a. The final piece of apparatus characteristic of this prior is the actuator cord 22; here it can be seen passing down through the cells between the bonding stripes 20. This cord, which has as its primary purpose the retraction of the shade array by urging the base slat 12 upward, will not be seen by the user because it passes internal to the cellular structure. In this resulting structure, the reader now sees that the Colson invention was attained by the stacking of planar sheets of web material, albeit folded sheets, to which patterns of glue or adhesive bonding had been laid down by predetermined positioning on the margins thereof. Hence, this art may be termed a cut -fold - glue -stack process of manufacture resulting in the inventor's desired stacked tubular, honeycomb array.

Before leaving FIG. 1, it is necessary to make one final definition of the apparatus herein encountered and implicitly or explicitly taught in both the prior art and the instant invention. Using the FIG. 1 Colson art as an example for illustrative purposes, if one were to pass a plane parallel to the base slat 12 through a set of glue or bonding lines, and a second plane through an adjacent set of creases, it would be observed that the first plane would not cut through cells while the second plane, say the upper plane, would pass through one cell. Therefore, this pattern is said to be a 0:1 or 1:0 cell pattern. Looking briefly at FIG. 2, and performing the same double plane passage through adjacent bonding stripe patterns, it can be seen that the first plane passes through two cells and the adjacent plane passes through a single cell. Therefore, FIG. 2 illustrates a 2:1 cell pattern. Throughout the remainder of this discussion, this form of cell patterning will be used to define the instant invention in relation to the prior art.

Turning more specifically now to FIG. 2, there is illustrated a stylized, isometric drawing of the Anderson invention 20'. Clearly a honeycomb array, the Anderson invention is prepared by first making a stack of separate, unfolded, elongate rectangular sheets 22. Glue lines 24 are laid down on the first such sheet spaced at desired intervals. In FIG. 2, glue lines 24 are shown with exaggerated thickness, as they were in FIG. 1. The reader should be aware that bonding or glue lines may be laid down as mere coatings on the web fabric and, consequently, will to a certain degree infuse the fabric itself, depending upon its inherent porosity. The portions of the web in the Anderson invention that are not given a glue or bonding treatment are denoted as ligaments b. In this artform, the shade body comprises opposed walls of thin, sheet-like layers 22 of flexible and resilient material joined together along spaced parallel adhesion lines 24 to form a plurality of continguous and parallel channels in the shade body. Thus, by following the assembly pattern of: sheet-three stripes-sheet-two stripes-, etc., the array depicted in FIG. 2 will be constructed. As noted earlier, the parallel plane test reveals this resulting pattern to be a 2:1 cellular pattern. Although having the advantage of a significant increase in the number of cells, this particular product fails to achieve the advantages of the prior art depicted in FIG. 1. Firstly, although the technique may acquire patterns of the form n : (n-1), or n : n, depending on the width of and number of stripes on the glued sheets, the resultant product with its multiplicity of glue stripings tends to be much too stiff and requires too much web material for usage in window treatments. Secondly, wherein the Colson art the pleat edges 16 are composed of the folded fabric, what amounts to a pleat crest in Anderson actually comprises a glue stripe 24 sandwiched between two web sheets 22. If one were to hope for the aesthetic appearance of the Colson type art in the Anderson embodiment, a great deal of expensive finishing would have to be applied to the pleat crests 26 as shown in FIG. 2. That actuator cord 28 may pass down through the array without being seen is of no particular moment since this honeycomb prior art appears to be lacking in the aesthetic fundamentals of the Colson and Rasmussen art while, admittedly, having a greater insulative character.

Lastly in the discussion relating to the prior art, FIG. 2A portrays an illustration of a honeycomb structure taken directly from the patent issued to Masuda. Masuda teaches a method that combines the cellular formation of Colson with the stacking technique of Anderson to acquire (in this illustration) a 4:4 structure having pleated / faces. It too suffers the methodology-intensive disadvantages of both Colson's and Anderson's inventions.

In order to gain the highly flexible and aesthetic characteristics of Colson, while acquiring the insulative attributes of Anderson, the instant inventors chose to make single cell and multi-celled structures out of a continuous web. By folding the web which has clever implacement of bonding stripes thereon, they developed a methodology which allows realization of the n : n cellular pattern.

Figure 3:
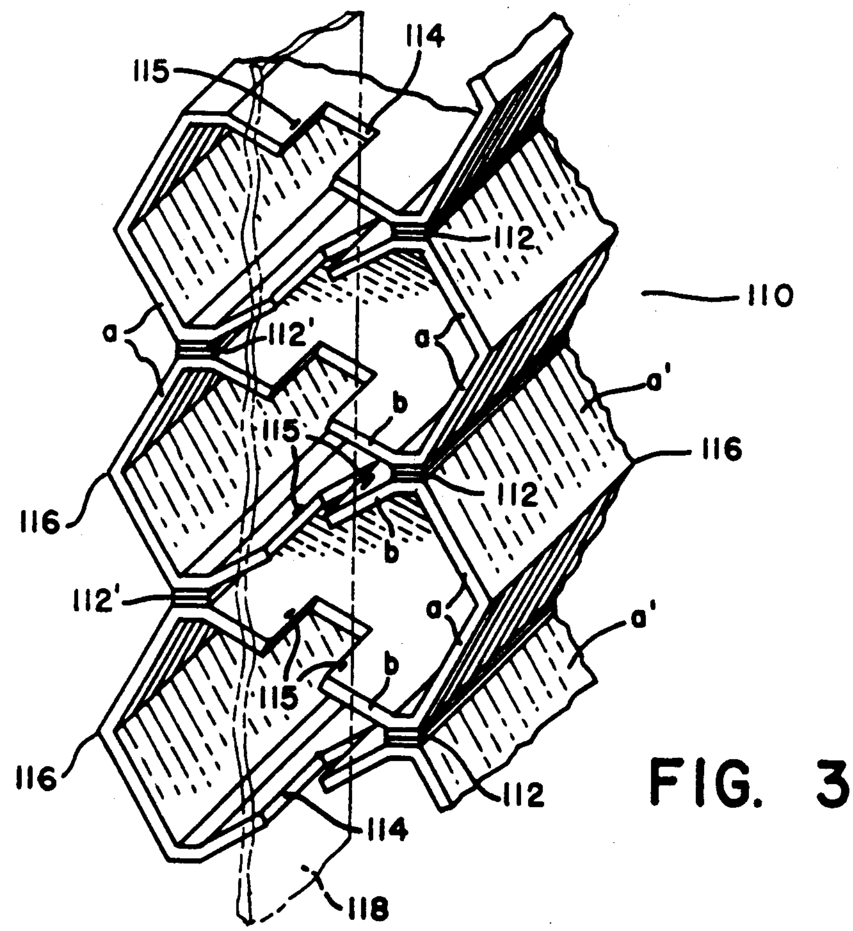
FIG. 3 is an isometric illustration of expanded single cell structure, according to the present invention.
Figure 3A:
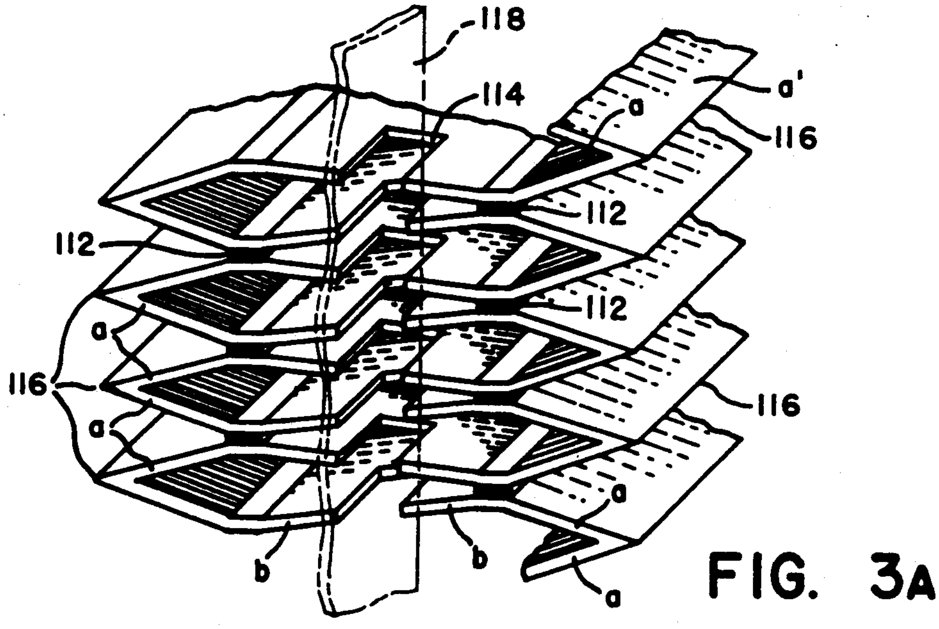
FIG. 3A is an illustration of the FIG. 3 structure, collapsed.

Particular now to the instant invention, FIG. 3 and FIG. 3A disclose a singular preferred embodiment, shown in the expanded and collapsed modes, respectively. For the purposes of lending brevity and clarity to the disclosure of the instant invention, FIGS. 3, 3A, 5 and 5A will be discussed with reference back to FIGS. 1 and 2, particularly when discussing the physical characteristics of ligaments and bonding lines in a multi-cellular structure. It should be remembered that a ligament is any part of the web, folded or unfolded, that is free of an adhesive coating; and, an adhesive stripe defines any part of the web that has glue or adhesive, whether fully or partially cured, applied thereto. A bond line results when an adhesive stripe adheres to another adhesive stripe or any other portion of the web. The term "line" is used simply because, to the untrained eye, the adhesive appears to be nothing more than a (barely) discernible line of a coating material. But, it is the character of appropriate adhesives to stiffen when fully cured and thereby impart to the web an integral, transverse structural element. Continuing now with reference to FIG. 3, there is disclosed, in a sectional orthographic illustration, the instant invention 110 in the Type 1:1 configuration. The reader may readily see that passing the imaginary horizontal plane (of the Type definition, above) through a glue line 112 and crease 116, a single cell will be traversed, passing through the fold 116. Passing the second imaginary plane through an adjacent glue line and crease will traverse, again, a singular cell. Thus, by previous definition, this type configuration is 1:1. The reader is advised in the manner of making the FIG. 3 embodiment. Starting with the web, i.e. a continuous fabric, a single adhesive stripe is applied between each preestablished index for a fold, substantially closer to the open side of the proposed fold than to the closed side. In appearance, a pair of adhesive stripes straddles a crease, each line equidistant from the crease and on the surface of the web that will be exposed to view. Reference is made to FIG. 3A which discloses the collapsed embodiment of FIG. 3, substantially as it would appear after the first folding operation. Fold lines 116 are discerned as the crests of the pleats that will appear in the finished product. Ligaments a, are parts of the web appearing between bonding lines 112 and folds 116; and ligaments b are ligaments of the web appearing between bonding lines only. When the resulting structure is expanded, as in FIG. 3, a continuous array of enclosed tubular cells is formed. If the bond lines are located such that ligaments a are substantially shorter than ligaments b, then the structure will reach its full extension with ligaments a approaching a parallel relationship with one another, without excessive twisting of internal ligaments b. The outer faces, the back and front of the shade panel, are for all intent and purposes identical. The viewer observes only a pleated shade, aesthetically pleasing to the eye. The design allows the inclusion of actuating and guiding means in the space between the structure's faces a' (the faces being defined by and comprised of ligaments a ). Ligaments b, within this space, may be pierced or slotted, or truncated (that is, the transverse length of the b ligaments, relative to the a ligaments, is shortened) in order to provide for any of the known actuating and guiding means, without danger of binding on said means. The reader's attention is called here to slots 114 which are representative of such modification or truncation. Herein it may be seen that a slender guide rail 118, also called a tongue or flange, may be enclosed by the portions of ligament b that are not cut out. Were the notch 114 to be widened to the extent that it is absent between the glue stripes 112, it would be defined as the truncated ligament mentioned above. The purpose of this notching 114 is to afford the use of the tongue or flange guidance 118 means shown in FIGS. 3 and 3A. Such guidance means, for directing the invention through vertical and nonvertical employment configurations, is considered throughout this exposition of the invention. It may be readily seen that, should certain installations (essentially horizontal) require maximum support within the shade, the truncated version of the slots 114 would most likely be used with the bonding line 112 structure used as the principal supporting surface contacting the guidance tongue 118. It is also suggested by the instant inventors that, should the herein disclosed notch 114 be preferred, additional coatings on the margins 115 thereof may be applied during the adhesive stripe application process. This would afford the notch 114 with a stiffened periphery and allow it to acquire the desired rigid character of the stiffened bond line 112. Relative to the proportioning of ligaments a and b, it is also notable that the dimensions of ligaments a and b can be set in such a ratio that ligaments b undergo a greater degree of twisting (due to contacting the tongue 118) for a given amount of structure expansion. By matching the width of the slotting or notching of the ligaments b with the thickness of the guidance means (or actuation means), binding of the structure may be made to occur at some definable degree of expansion. This controls the expansion countering to independent external forces that act upon the structure, notably gravity, imparting an additional uniformity to the degree of expansion throughout the length of the structure than would occur in a fully free-fitting embodiment or an ever-binding fit as taught by Anderson.

Figure 4:
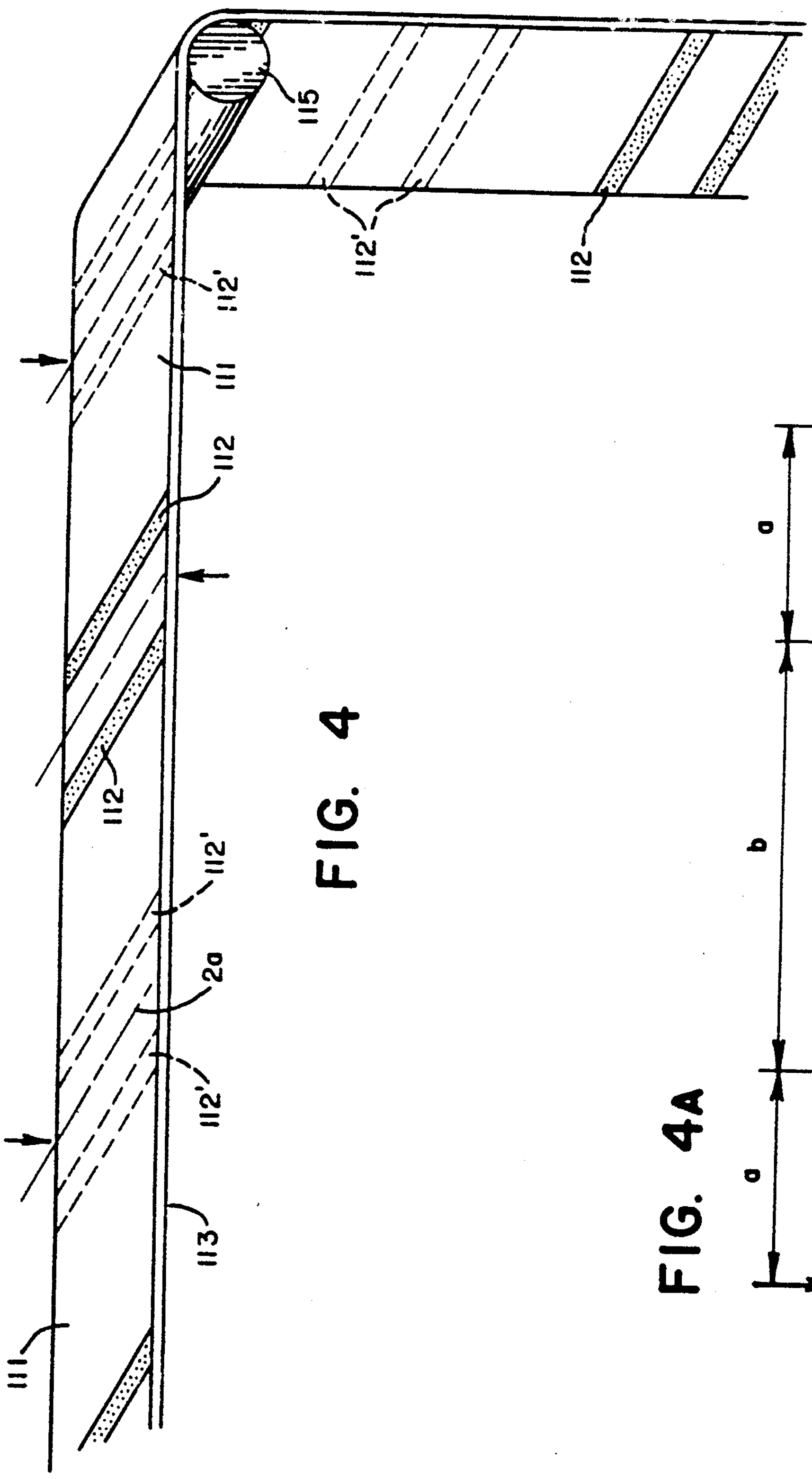
FIG. 4 is an isometric illustration of the adhesive stripe pattern for the FIG. 3 structure.
Figure 4A:
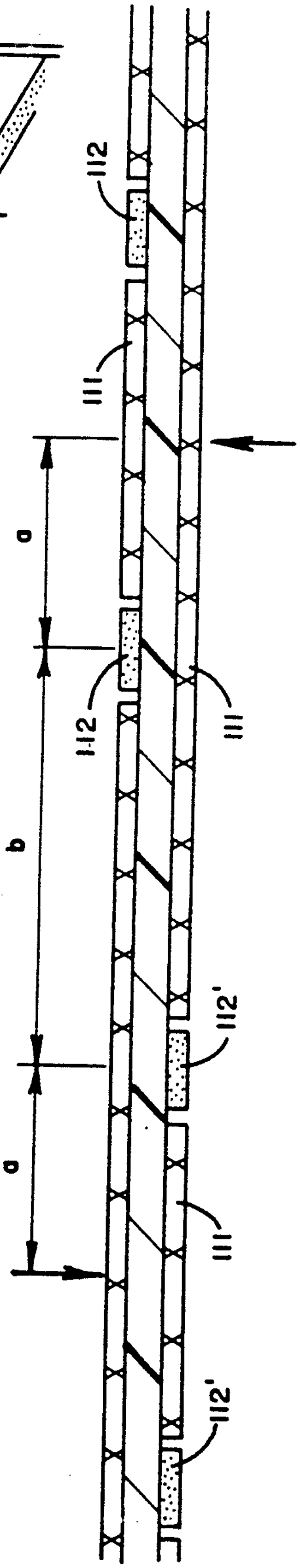
FIG. 4A is a cross sectional schematic of the coating pattern in FIG. 4.

For the purposes of illustration, the isometric illustration of FIG. 4 is highly stylized in that the web 111 is shown with an imprinted pattern of coatings, the adhesive stripes 112 denoted by stippling and any other coating 113 as plain webbing. The web is shown passing over roller 115 and is displayed considerably narrower than it would actually be. The web 111 is actually printed top and bottom and the adhesive stripes 112 that appear in FIG. 4 are alternatingly placed with adhesive stripes 112' that appear on the underside. FIG. 4A is a side elevation of the web and presents the coating scheme of FIG. 4 in cross section. The large barbed arrow heads denote the points of fold as they appear in their alternating pattern. As the web is folded, in the direction of the bold arrow head, ligaments a, as indicated herein, become well defined. They are, as previously mentioned, the webbing portions located between a fold and its adjacent adhesive stripes. Discernible in FIG. 4A is the resulting ligament b, the webbing between adjacent adhesive stripes, herein 112 and 112'. This coating and folding pattern realizes the Type 1:1 structure disclosed in FIGS. 3 and 3A.

Figure 5:
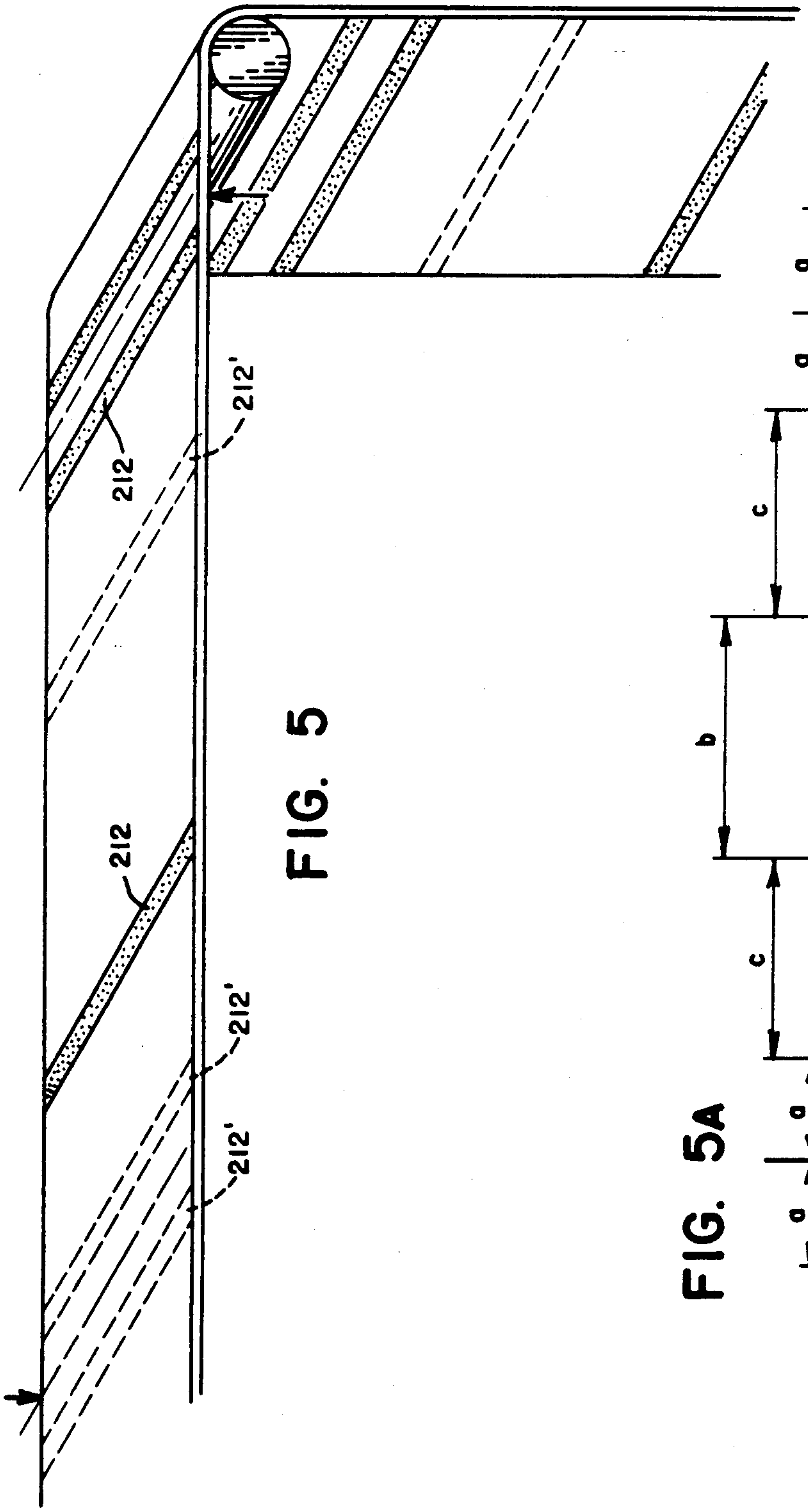
FIG. 5 is an isometric illustration of the adhesive striping pattern for the multi-celled structure of FIG. 6.
Figure 5A:
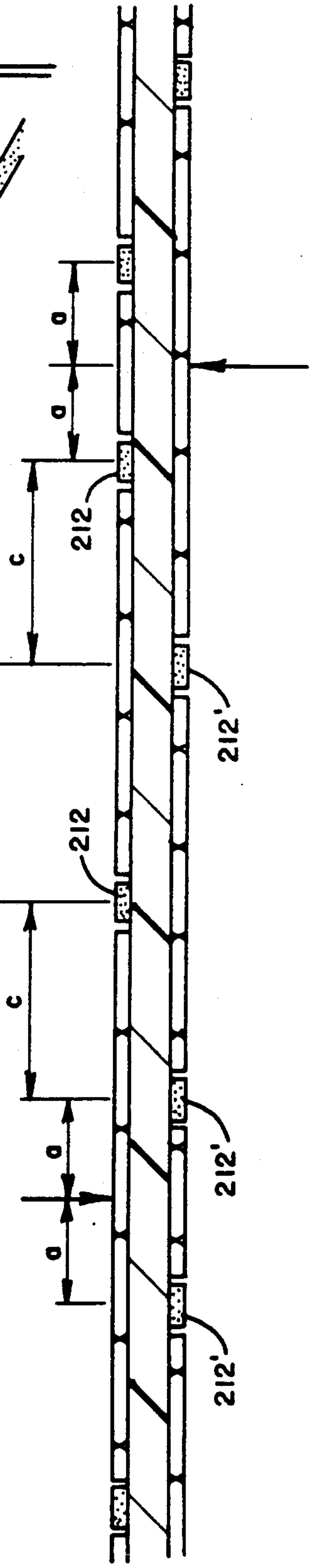
FIG. 5A is a sectional schematic of the FIG. 5 pattern.

In much the same manner as the aforementioned construction of Type 1:1, Type 2:2 configuration of the invention may be achieved by altering the bonding or adhesive coating pattern. Rather than a single adhesive stripe applied between each fold, two adhesive stripes are applied (to both surfaces), the first substantially closer to the open side of the fold than to the closed side (as was the case with Type 1:1), and a second adhesive stripe applied between the first adhesive stripe and (the closed side of) the fold. FIGS. 5 and 5A exemplify this alternate coating scheme and the reader may refer to them employing the same terminology used in the description of FIGS. 4 and 4A. The adhesive stripes are disclosed as stipled bands, the invisible bond boundaries denoting adhesive stripes on the opposite side of the isometric illustration. Other coatings are left blank in the orthographic illustration (FIG. 5) and denoted by a series of "x's" in the cross sectional (FIG. 5A). The reader should also understand that when the applicants speak of a number of adhesive stripes applied between each fold, it is meant that said adhesive stripes are being applied to both sides of the web, irrespective of whether the fold is made upward or downward. Thus, in FIG. 4, one notes that two adhesive stripes appear between the fold lines (indicated by bold arrow heads), one above and one below the web. In FIG. 5, two adhesive stripes appear between two folds, both above and below the web. The resulting pattern, from the folding and emplacement of adhesive stripes is more readily discerned in the cross sectional side elevation of FIG. 5A. Therein, in conjunction with FIG. 5 and with reference back to FIGS. 4 and 4A, it will be noted that this alternate striping pattern effectively creates two additional ligaments termed, c ligaments. The sequence between folds of the Type 1:1 can be seen (from FIG. 4A to be fold - a - b - a -fold; whereas, in the Type 2:2 configuration, the pattern is fold - a - c - b - c - a -fold. When the folds are completed in the direction indicated by the bold arrows of FIG. 5A, the partially cured adhesive stripes 212 and 212' are brought into contact with the alternate faces of the pleats, giving rise to the folded structure shown in FIG. 6A.

Figure 6:
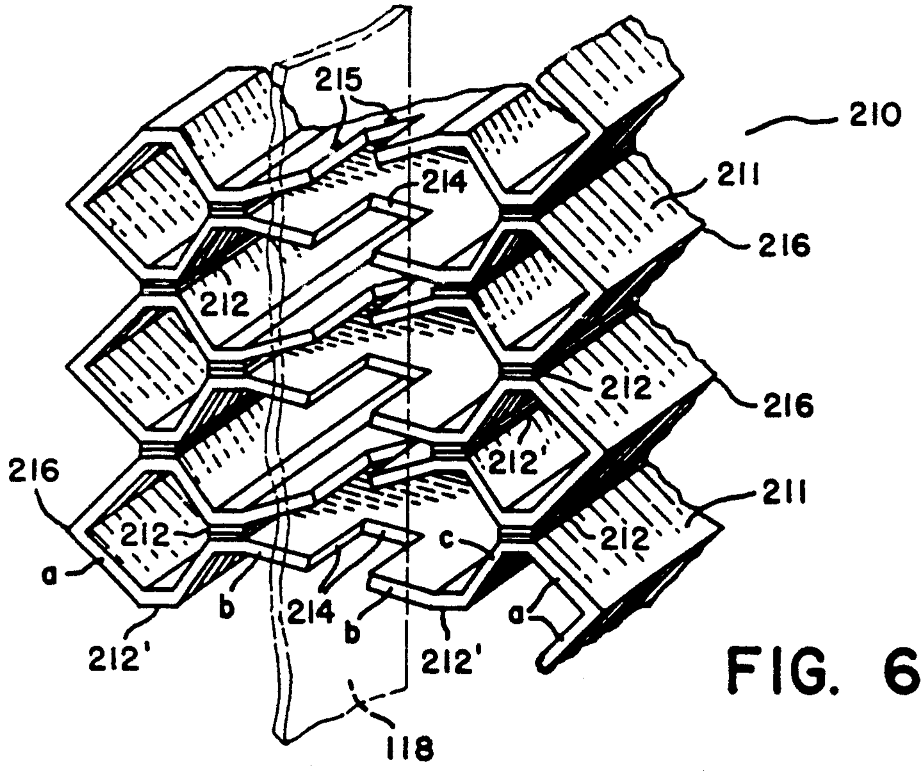
FIG. 6 is an isometric illustration of expanded multi-celled structure according to the present invention.
Figure 6A:
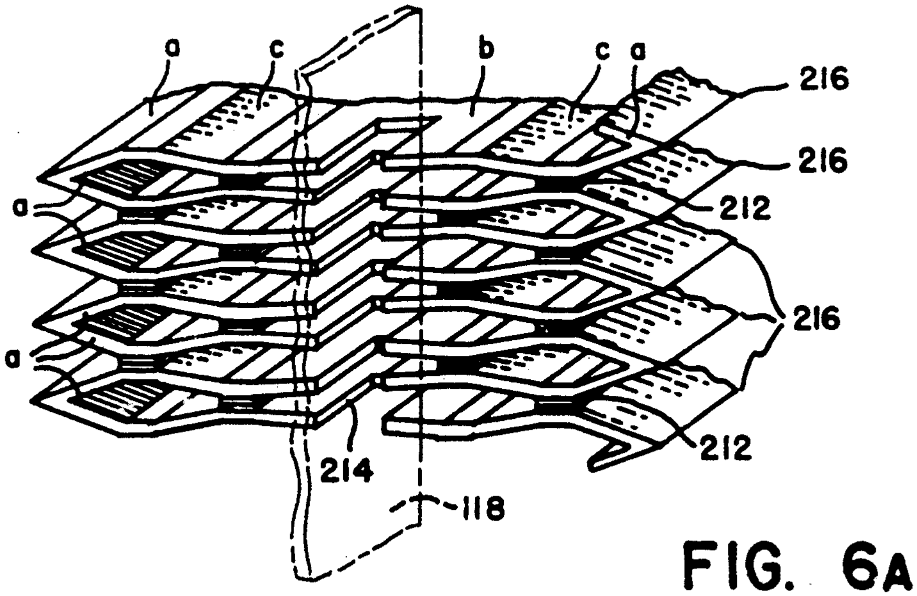
FIG. 6A is the FIG. 6 structure, collapsed.

Referring more particularly now to FIGS. 6 and 6A, there is shown the Type 2:2 preferred embodiment in isometric illustration, expanded and collapsed modes, respectively. To review the salient elements of the invention disclosed therein, the reader views the multi-cellular insulating shade 210 comprising a web 211 alternatingly folded, first in one direction and then the other, along transverse lines 216. On alternating sides of the pleats formed by the folding are bond lines, comprised of the joined adhesive stripes 212 and 212'. By the stylistic patterning of the bond lines, a cellular development interstitial of the pleats a is formed, the wall structure of the interior cells being defined by pleat face ligaments a, and interior ligaments b and c. Notches 214 are represented in the b - c ligament-defined (centermost) cellular array which function exactly as those defined as notches 114 in the exposition of FIGS. 3 and 3A. Likewise, glue reinforcement 215 about the periphery of notches 214 may also be opted by the manufacturer of this embodiment. All other factors appertaining to the Type 1:1 configuration apply in the Type 2:2 configuration, and indeed, in any of the Type n : n configurations. It can be seen that this variation of the Type 1:1 embodiment provides more thermal insulation, but at the cost of significant additional material. It may be deduced that, by appropriate spacing of the bond lines, the relative lengths of ligament Types a, b and c can be controlled and varied. In particular, the intermediate ligaments c can be made shorter then ligaments a and b so that ligaments c become the limiting (length) ligaments in the expansion of the structure. This will allow central ligaments b to be subjected to limited twisting (in order to prevent or control binding), while ligaments a may be made longer than in the Type 1:1 structures in order to provide a fuller and more deeply pleated appearance at full extension. Such will enhance the aesthetic appeal of the finished product.

Prior to a detailed description of the machinery used to make the embodiments herein disclosed, brief attention is devoted to the extrapolation of methods used by the inventors in the preparation of multi-cellular shade structures. It may be readily assumed that any number of adhesive stripes may be applied between each fold to create more bond lines and thereby greater numbers of cells through the structure's thickness or depth. However, since all new ligaments will be essentially intermediate the c ligaments, no additional capabilities would be acquired save possible enhancement of the insulating value. Such an increase in the cell count, however, greatly increases the cost of manufacture without equal incremental increase in insulation value as revealed by Anderson. Thus, there is little economic incentive to increase the numbers of cells in the structure thickness. The inventors have utilized the Type 3:3 structure, but found it no more aesthetically pleasing, it being much heavier and stiffer. Therefore, it has no significant advantages over the Type 2:2 structure.

Figure 7:
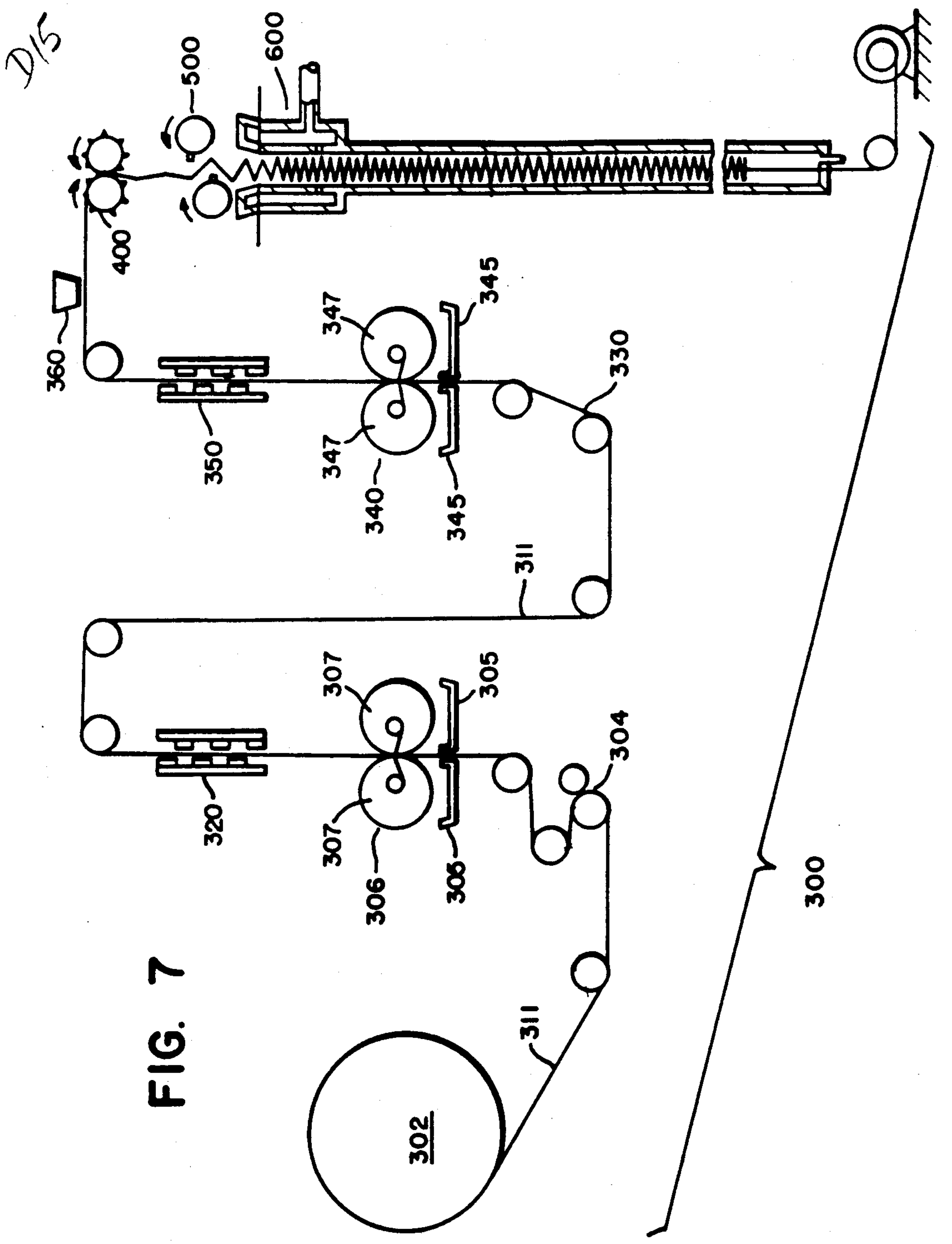
FIG. 7 is a schematic illustration of the machinery layout for the instant invention.

The manufacture of the preferred embodiments of the instant shade product is accomplished through an amalgamation of known techniques and machinery such as screen printers, phasing control electronics and adhesive curing apparatus with machinery conceived and made by the instant inventors, such as the hereinafter disclosed pleating and folding machinery. Tying all of the apparatus together so as to realize the desired product is the methodology or process which begins with a single continuous fabric web and results in a completed product that is only then separated from the continuous web for final curing. Illustrative of the machinery and process used to acquire the preferred product is FIG. 7, a schematic drawing of the production line 300. The process is begun with an unrolling of the web 311 from the supply reel 302. The web is passed through a tensioner station 304, the function of which is to maintain proper tautness in the web throughout the first process to be performed thereon. After passing through the tensioner 304 the web passes through the first screen printing station 306, between the drip trays 305 and the print rollers 307 thereof. The screen printer, like the source roller and tensioner 304, comprises existing machinery and has as its primary function the ability to print and/or coat the web 311, both top and bottom, with various desired colors, patterns or coatings, exclusive of adhesive. These other coatings, addressed in FIGS. 4–5A, may be comprised of colorings, texturings or myriad forms of reflective or insulative coatings. In keeping with the type of coatings thus applied at the first screen printing station 306, the next station to be encountered by the newly coated web is the first curing station 320. This station renders a full cure to the coatings previously applied, i.e. to fully "dry" the coatings and thereby reduce porosity of the web. At this point, the web has been coated, on both sides, with preselected coatings at predesignated locations. It should be noted that multiple stations which apply coatings to only one side per station, but are otherwise similar to the two-sided coaters described here can be used if desired. Passing out of the first curing station, the web moves to a registry detection station 330, the function of which is to provide final adjustment in the web travel so that the uncoated spaces, both top and bottom, will be properly aligned for deposition of the adhesive or bonding material. Immediately thereafter, the web is passed into the second screen printing station 340 where, like at the first, it passes between drip trays 345 and screen printing rollers 347 to be coated with the predetermined bonding line scheme. Subsequently, the web, bearing adhesive applications on both sides, is passed into the second curing station 350. This station differs from the first in that only a partial cure is effected. Where at the first curing station a full cure was required in order to completely dry the color, reflective and insulative coatings, now only a partial curing to the "gel" state is made. The adhesive must remain in a partially cured state until it can be brought into contact with another section of the same web to effect the bond lines. After leaving the last curing station 350, the web is passed downline to the creaser 400. Immediately before its encounter with the pleater, the web is subjected to final scrutiny by passing it over the phase reader 360. The reader operates with creaser 400 causing the diameters of rollers 402 to vary, thus controlling the pitch of the pleats and the phase of the pleats relative to the print pattern.

After proper phasing relationship is established relative to the adhesive stripe (print) placement, the web is introduced to the creaser 400. There, creases or folds are made in the web, in alternating pattern(s) after the fashions described in FIGS. 4–5A. Upon exiting the creaser 400, the alternatingly creased web is passed to the folding machinery 500, 600. The first portion of the folding machinery comprises a pair of counter-rotating air knives fixed in set-apart registry and receptive of the creased web between them. The air knife, a device well known in several industries, comprises a machine capable of emitting a steady, intense flow of air along a predetermined path. In this instance, both air knives emit this intense flow of air in a straight line, transverse the web. Since the knives are spaced one from the other and rotate in opposite directions, there is effected between them a shearing wind pattern. As the web passes between the rotating air knives, its presence forms a barrier and, if the rotation and counter-rotation of the air knives 500 are properly phased, the shearing effect of the radially moving planes of air will cause a fold at the creases of the web by intensifying the folds at their troughs. Continuing in the pattern of rotation, the air knives urge the trough (which each respectively fills) towards the direction of web movement. The urging of the folding web is such that it is readily introduced into the second substation of the folding apparatus, the batcher 600. The batcher 600 is an essentially elongate rectangular confinement which is adapted to accept the air knife - advanced web into its interior. The batcher is the second piece of apparatus devised expressly by the instant inventors for the purposes of realizing the uniquely constructed product. It should be readily understood by the reader, indeed those of ordinary skill in the art, that with the folded shade adequately gathered into the batcher, there is little left to accomplish save acquiring the final cure to the partially cured adhesive stripes to form bond lines. The point at which the pleated fabric enters the batcher 600 in the collapsed state signals accretion (uniting by adhesion) of the desired product and the end of the algorithmic manufacturing process. Depending upon the types of adhesive used, it is conceivable that collection in the batcher could signal termination of the entire process. For the purposes of the instant inventors, and because this process has further applications which will be discussed hereinafter, the final cure is effected at a station remote from the batcher and will be discussed when appropriate hereinafter.

Figure 8:
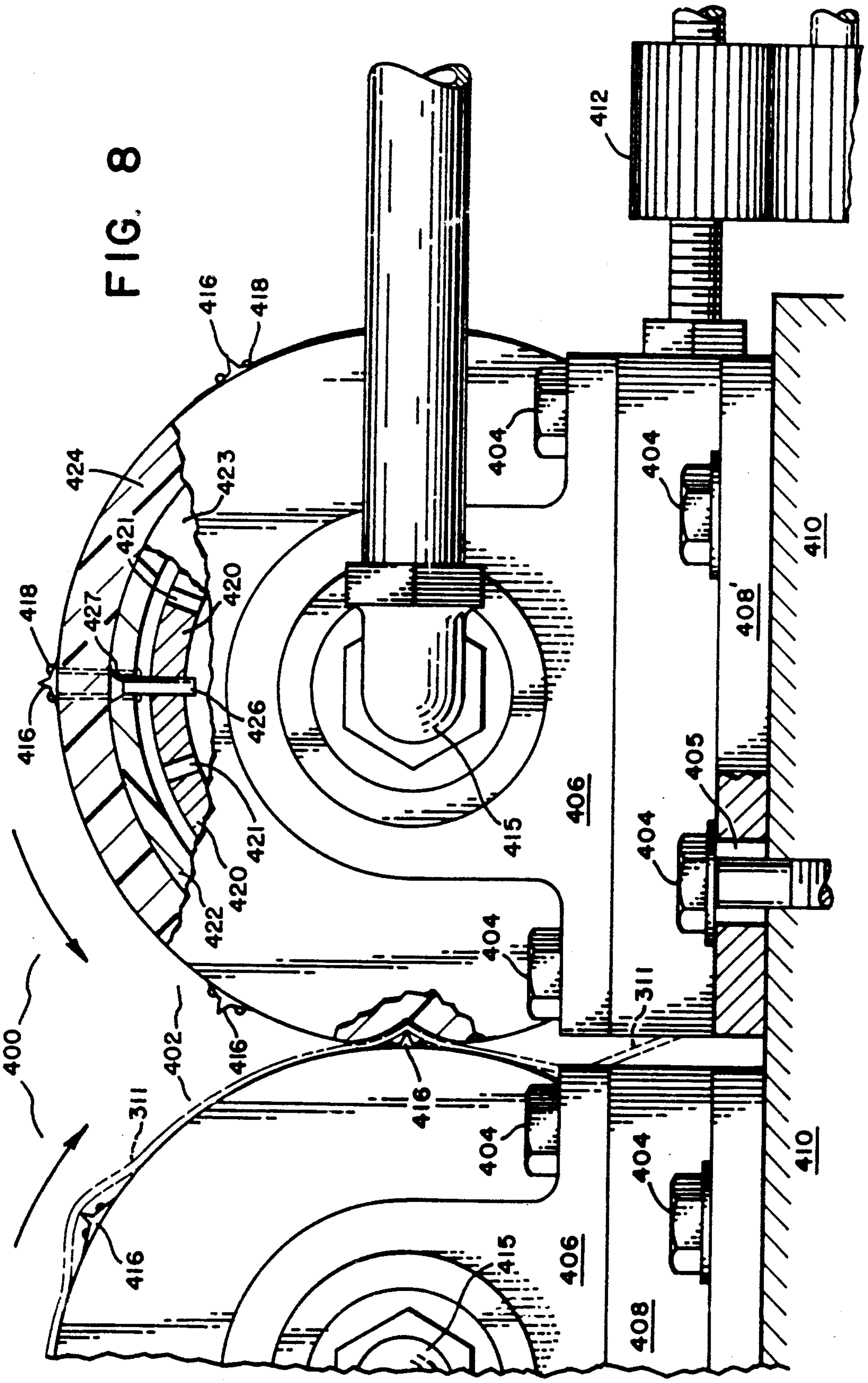
FIG. 8 is an end elevation, partially sectionalized, of the roller-type pleater employed in the instant invention.

The creaser 400 is illustrated in a partially sectionalized side elevation at FIG. 8. The reader views the pleater as comprising two roller assemblies 402. Passing therebetween is the web 311, having been properly tensioned so that pleats may be made in proper registration with the bond striping. One roller assembly, here the left-hand partially shown assembly, is rigidly mounted by the bolting 404 of its pillow block bearing 406 to the slider block 408, that is rigidly mounted to the pleater pad 410. The second roller, in FIG. 8, the right hand illustrated assembly, is similarly bolt-mounted 404 to the fixed bearing pillow block 406. Unlike the first assembly, however, the second roller assembly is bolted to an adjustable slider block 408′. The adjustability of slider block 408′ derives from the fact that the bolt 404 holes 405 for this assembly are over-sized and allow adjustment mechanism 412 to exert a force on the slider block 408′ so as to adjust the center spacing between the two cylindrical roller assemblies 402. An air pressure supply line 414 is seen entering the roller assembly at the pillow block central thereto and axial of the roller assembly 415. The last outwardly visible elements of the roller assembly are the crease ridges 416. The crease ridges are essentially inverted "V" shaped protrusions which run the length of the roller and are ostensibly bolted or riveted 418 to the outer periphery of the roller assembly.

In the cut-away portion of FIG. 8, on the right hand pleater roller subassembly, the reader will note the tripart, concentric cylinder roller structure as it actually exists. Moving from the axial center outward, the structure comprises a first or inner rigid, foraminous cylinder that is rigidly fixed to the cylinder end plate 423 and rotatable therewith on the cylinder bearing. Next, an intermediate cylinder comprising a bladder is likewise sealed to the cylinder end plates 423 in spaced-apart registry from the foraminous inner cylinder. It rotates with the inner foraminous cylinder. One now recognizes the cooperative relationship between the air pressure supply 414 passing through the sealed bearings 415 into the perforated chamber formed by inner cylinder 420 and bounded sealably by the second cylinder (bladder) 422 as effecting an air-controllable cylindrical surface that may be caused to expand and contract, thereby effecting a slight change in diameter of outer cylinder 424 which adjusts the crease pitch relative to the bond lines. The outermost cylinder 424 comprises a resilient shell which is in contact registry with the intermediate cylinder 422, but is not attached to the rotating cylinder end plate 423 that couples inner cylinder 420 with bladder cylinder 422. The outer cylinder is composed of a resilient material that is responsive to the flexing of intermediate cylinder 422, but such a material that it will remain inactive and nonadhesive to the partially cured bonding material which it will contact, such as silicone rubber. Final to this illustration is the apparatus which effects not only the fixing of the crease ridges 416 to the outer cylinder 424, but also couples the outer cylinder to the foraminous inner cylinder 420. The crease ridge 416—fixing and outer cylinder 424—coupling assembly is comprised of rivets 418 and a torque coupling pin 426. The rivets pass through the outer flanges of the crease ridges 416 as shown in FIG. 8 and down through the outer and intermediate cylinders. Captured therebetween is the cap 427 of torque coupling pin 426. The torque coupling pin is freely slidable in selected foramens 421 of the inner cylinder 420. Cap 427 provides a seal that prevents air leakage from bladder cylinder 422. Thus, the coupling pin assembly couples the rotation of inner cylinder 420 to the outer cylinder 424 and, because of its slidability in foramen 421, allows the expansion and contraction of the outermost cylinder 424 as the intermediate cylinder-bladder 422 is caused to flex by the introduction or evacuation of air through supply line 414. If the phasing or pitch of creases between adhesive stripes is improper, air is forced into or evacuated from bladder 422 causing it to expand or contract, thus adjusting to the proper crease pitch and phase (registry). In the pleating operation, the web to be pleated 311 is introduced between the rollers which are moving in the direction indicated by the barbed arrows. As the properly phased crease ridge 416 comes in contact with the web, it nips it between its crest and the opposing roller, which at that space on its surface is devoid of ridging. The crease ridge 416 presses the web into the resilient surface of the roller thus effecting the crease in the web; and the creased web 311′ exits between the pleater rollers. Immediately thereafter, as generalized above, the creased web enters the folding station air knife subassembly 500.

Figure 9:
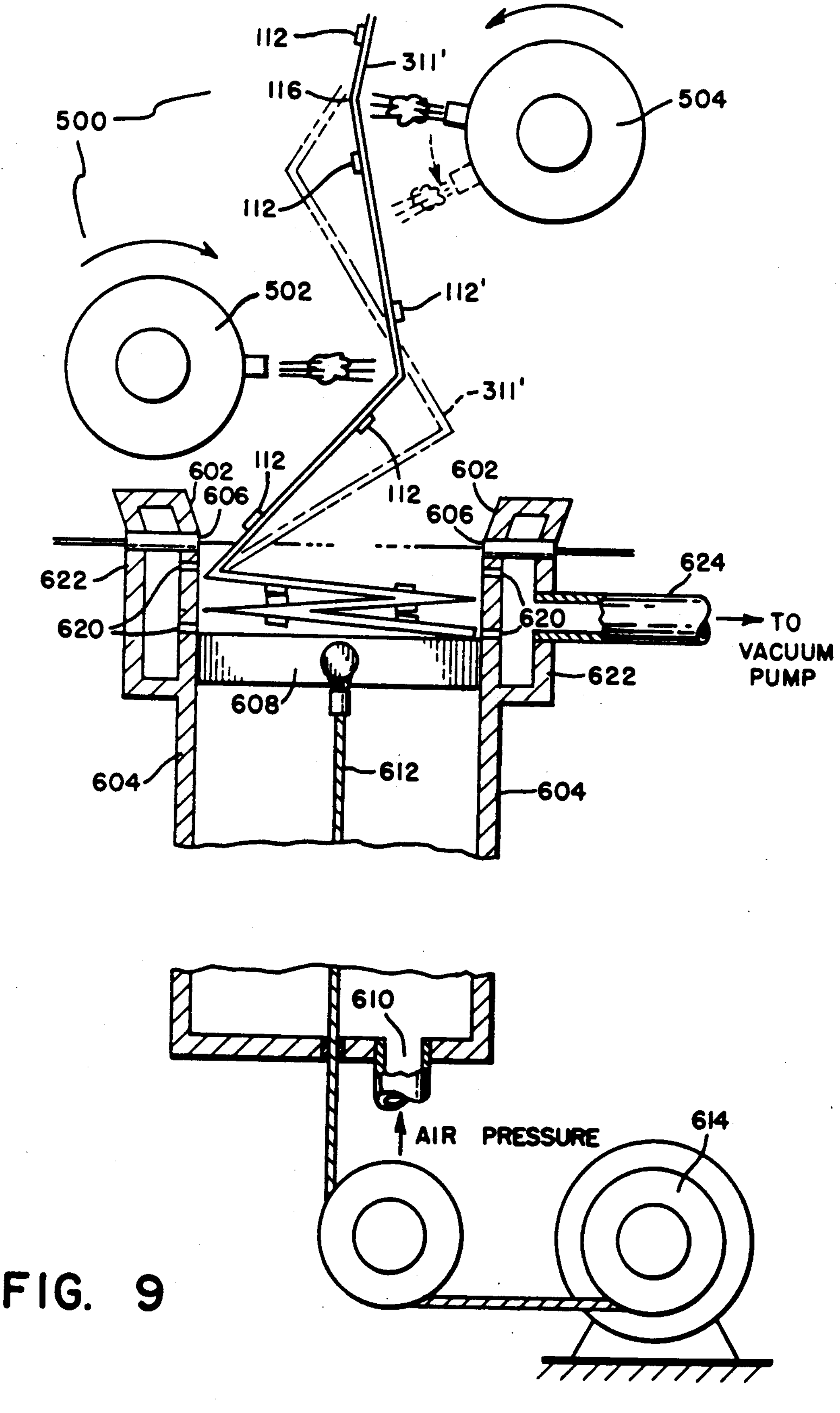
FIG. 9 is a schematic, sectionalized illustration of the folding station employed in the FIG. 7 machine.

In a greater detailed schematic drawing, FIG. 9 portrays the subsequent operations performed on the creased web 311′ that has been adhesive coated so as to acquire the Type 1:1 shade configuration. As the creased fabric enters the air knife subassembly 500, the first rotating knife 504 exerts its continuous stream of air downward enhancing the crease 116 and, rotating counter-clockwise, the first air knife 504 in conjunction with the second air knife 502 that is rotating clockwise, urges the fabric, while effecting a more pronounced fold, toward batcher box subassembly 600. When the air knives 502, 504 are in proper phase relationship, they will effect a continuous folding and urging of the creased web 311' toward the mouth 602 of batcher subassembly 600. The mouth receiving portions 602 of batcher box 604 are splayed with a smooth radius so as to receive and guide the now folding web smoothly into the box 604 interior. Located proximate the periphery of the box 604 proper is an electronic fold sensing network which detects the crest of every pleat passed into the mouth of the box 604. Sensed data are transmitted to the batcher box fill control (not shown herein). This assures that proper stacking takes place as the web 311' is folded into the batcher 604 by the action of the air knife subassembly 500. As the folded web enters the batcher box, it encounters first the air pressure motivated base 608. Also proximate the sensor 606 is a series of peripheral ports 620 which, connected through peripheral chambers 622, draw off air which has accumulated at the mouth 602 of the batcher box 604. The air overpressure is drawn off through conduit 624. Concurrently, as air pressure is being supplied through air supply line 610, thus urging base 608 outward, data being sensed at sensor 606 are (through suitable control means not shown herein) cause the actuation of stepping motor 614 to draw up cable 612, thus retracting base 608. Thus, as the count of folds is increased at the electronic sensor 606, the pressure supported base 608 is drawn toward the bottom of the batcher box 604 and the ensuing stack of pleated fabric is accomplished orderly and precisely. It can be seen from the foregoing FIG. 9 illustration that adhesive stripes actually adhere to adhesive stripes to form bonding lines. This may not always be the case and partially cured adhesive or bonding material may be placed in contact with portions of the web not bearing adhesive. Such adjustments to the manufacture are readily conceivable by those taught this form of manufacture by the instant disclosure. Likewise, it may be readily inferred from these teachings that the adhesive used may be a slow, air curing type of adhesive. Thus, subsequent curing or secondary curing techniques may not be required and final bonding and curing may take place in the batcher box with full accretion therein providing the desired, finished product.

Figure 10:
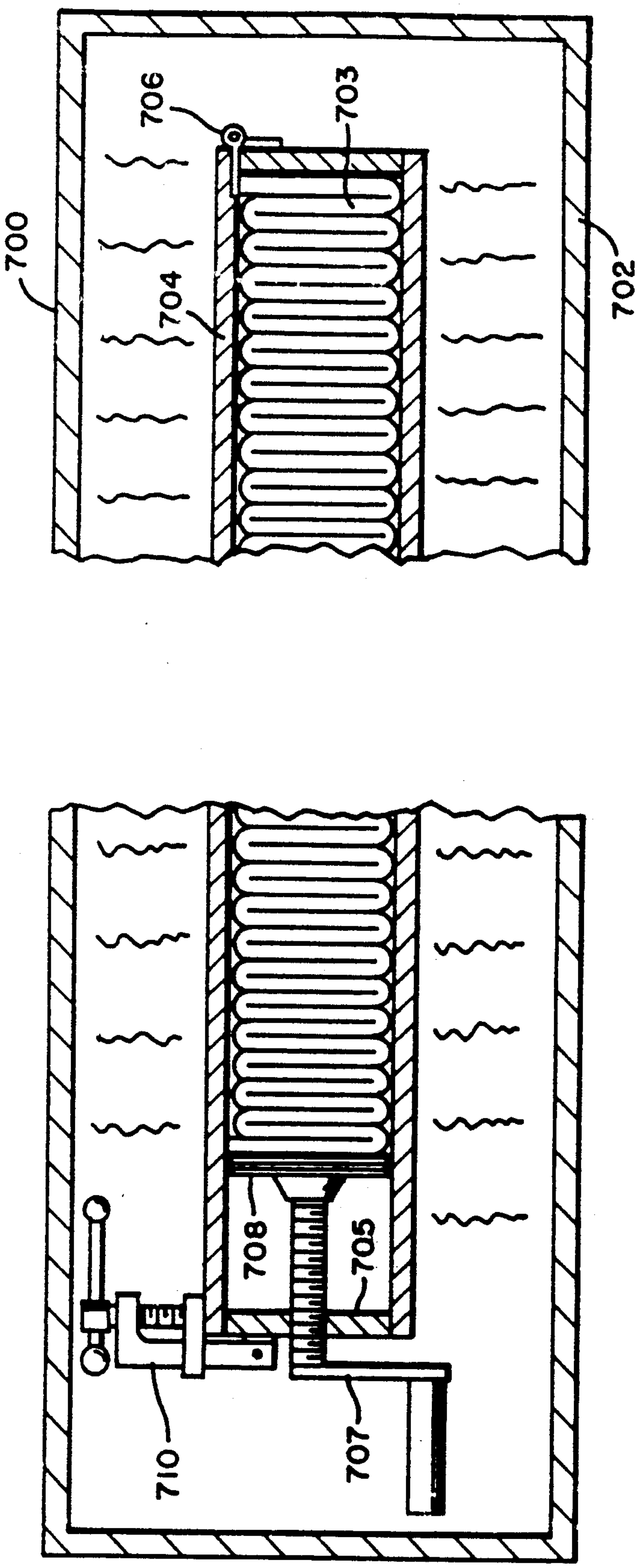
FIG. 10 is a sectionalized schematic of the curing oven used in a final subprocess for the instant invention.

For the purposes of the complete disclosure of the instant invention, the inventors have provided the apparatus that they choose to accomplish final or secondary cure of the product. In FIG. 10, there is illustrated a sectional schematic of the curing oven 700. The collected product, in its partially cured stage, has been removed from batcher box 604 and placed into curing box 702. The curing box is as long and as narrow as required by the folded web and the pleat width, respectively. The batch or stack 703 is placed into the box and compressed therein by actuation of the handdriven plunger 708. Plunger 708 is somewhat analogous of air-actuated batcher box base 608. In this case, the plunger 708 is used to further compress the stack of folded web. When the stack is placed into the box, however, plunger 708 is withdrawn completely to front side 705 of the curing box. Immediately after emplacement, curing box lid 704, hinged at its rear margin by hinges 706, is closed. Securing mechanism 710 firmly secures lid 704 to the box proper. Thereafter, hand cranks 707 are used to actuate plunger 708 and, by compression, conform the stack to a desired shape prepatory to insertion into the oven 700, for final thermal cure.

There are many advantages that the present invention achieves over the prior art. Advantages over the simple pleated shade are obvious: the cellular structure provides improved thermal effectiveness while hidden actuation and guidance means give improved appearance; the resultant shade has greater intrinsic stiffness for non-vertical installations; controllable fullness at full extension further enhances the appearance and thermal performance: and actuation and guidance are acquired with low-friction operation. The advantages over the bonded plurality of tubes structure are: the overlapping cells further enhance thermal effectiveness; use of a continuous full width web allows ease of application of decorative patterns on the exposed pleated surfaces low-friction operation at the shade-actuator or guide control interface; and much lower cost of manufacture is attained through the use of continuous raw material than with conventional pleating and cutting equipment. Finally, the advantages over sheet-bonded structures are manifold: controllable fullness at full extension for improved appearance; lower cost of manufacture by the use of continuous sheet material; almost frictionless operation in actuation and guidance; and a greatly enhanced appearance through the elimination of exposed raw edges and bond lines. Further, advantages of the present invention which were not extensively expounded include, factually: any flexible sheet material may be used, woven or nonwoven; any degree of opacity is achievable, using sheet goods ranging from fully transparent to fully opaque, depending on application; additional coating may be applied before or after fabrication, either to one or both faces, or to all surfaces, to enhance appearance or to optimize performance -either thermally or optically; any width can be produced, limited only by the processing machinery; any length can be produced, limited only by the length of available sheet goods (which can be edge-bonded into ever longer continuous webbing); any thickness with any reasonable number of cells can be produced, limited only by the reach of the pleating machinery and bonding mechanism; any known guidance or actuation means can be used with this structure including guide track systems, both internal and external, motorized or nonmotorized; and, any known attachment system can be used including direct mechanical connectors, magnet-and-strip, and rod-and-hooks. Finally, the processing method itself need be only slightly modified to economically produce another, related product. In the instant inventors' copending patent application, Ser. No. 209,090, now U.S. Pat. No. 4,884,612 which discloses a shade comprising a pleated shade with rigid slat-like tails pivotally attached to the troughs of the pleated shade, effective use is made of the instant process. The rear edge of the tails are connected together by the conventional ladder line of a Venetian blind. Actuation of the ladder line in the conventional manner urges the raising and lowering of the tails so as to cause them to pivot about their points of attachment along the troughs of the front curtain's pleats. Rotation of the slat-like tail effects a closing of the pleat sections into individualized tube-like cells. By varying the pattern of bond line application and substantially widening the bond lines to include a larger portion of the fold depth, it is possible (by using the instant process) to realize a structure in which only the pleated and smaller area of the web would remain unstiffened. Such a structure would be essentially that just described, a pleated shade having rigid, slat-like extensions or tails pivotally attached to the troughs thereof.

Having gained an understanding of the instant invention, as well some insight into related application of the process, it is possible for one to devise many varied configurations of multi-cellular construction. By imaginative application of the principles disclosed herein, the shade designer, as well as the manufacturer, may custom design myriad window covering treatments. The extent and breadth of the instant inventors' teachings are limited, therefore, only by the hereinafter appended claims.

What is claimed is:

1. A machine for making a pleated curtain structure from a single continuously fed length of flaccid material web comprising:

means for continuously feeding a continuous material web into a printing assembly;

coating means for applying one or more coatings in a predetermined pattern to said moving web;

detecting means positioned to detect the position of said coating pattern which was actually applied by said coating means to said moving web;

pleating means for creating pleat creases in said moving web at predetermined locations thereon that are transverse to the length of said web;

pitch adjusting means controlled by said detecting means for dynamically modifying the pitch of the pleats produced by said pleating means while the web is being pleated; and folding and receiving means to fold the coated and pleated web along said creases while accumulating the pleated web in a confined stack.

2. The machine of claim 1 wherein said folding and receiving means comprises an air knife assembly for dynamically applying opposed streams of air against the opposing sides of the creases web, said air knife assembly comprising a pair of counter-rotating air knives located on opposite sides of the creased web and longitudinally spaced along the moving web path a distance substantially equal to the space between two adjacent and oppositely directed web creases, each of said air knives emitting a narrow elongated stream of air extending substantially the full transverse width of the web, and said air knives rotating to continue to direct said air streams at the web creases as the creases pass said air knives.

3. The machine of claim 1 wherein said receiving means comprises an elongated rectangular box of depth sufficient to accommodate a predesired-length of said pleated web, said box further comprising air evacuation orifices located adjacent to the web entry end of said box to aid in the compacting of said pleated web within said box, said box collecting said pleated web therein and providing thereby an accreting confinement for said web which has been coated with an adhesive bonding pattern between the pleats thereof.

4. The machine of claim 3 further comprising a movable, controllable platform-type base within said box, base position control means for positioning said base along the length of said box interior so that said base may be first presented at said web entry end of said box during the beginning of web filling and gradually withdrawn along the length of said box interior as said box is filled with the folded web.

5. The machine of claim 4 wherein said control means comprise sensors located adjacent to the entry end of said box, pneumatic pressure ducted into said box between a closed bottom end of the box and said movable base, and a retracting cable connected to a stepping motor and said base so that said pneumatic pressure and said mechanical stepping motor assembly cooperate to move said base towards and away from said entry end of said box.

6. The machine of claim 1 wherein said pleating means comprises a pair of counter-rotating opposed cylinders between which the web may be continuously fed, said cylinders including a resilient outer shell, the exterior diameter of said cylinders being continuously adjustable while pleating of the web is in progress;

web creasing means fixed to the exterior of said cylinder shells at circumferentially spaced intervals and extending parallel to the rotational axes of said cylinders;

said pitch adjusting means comprising inflatable bladder means within said cylinder shells and engagable with the inner surface of said cylinder shells to vary the exterior diameter of said cylinder shells in response to variable air pressure supplied to said bladder means;

air supply means connected to the interior of said bladder means for supplying a variable air pressure thereto;

whereby the pitch of said creasing means can be varied by controlling the air pressure supplied to said bladder means, to thereby increase the diameter and circumference of said outer shells.

7. The machine of claim 6 wherein said outer shell of each of said cylinders is resiliently compressible to yieldably receive creasing means on the other of said cylinders to thereby cause the web to be creased by the deflection of said web by said creasing means of one of said cylinders into the locally yielding surface of the other of said cylinders.

8. The machine of claim 7 wherein said bladder means is positioned between said resilient outer shell and a rigid perforated inner shell, the perforations of said inner shell providing a passage for the pitch controlling air to reach the interior of said bladder means from the interior of said inner shell and said air supply means;

said web creasing means being anchored to said inner shell by slidable connecting means which permit said web creasing means to move radially but not circumferentially relative to said inner shell.

9. A method of forming a multi-cellular collapsible shade in the form of a single continuous length of pleated flexible web material comprising the steps of:

coating portions of both faces of a continuously fed web with an adhesive bonding substance in a predetermined pattern, said pattern comprising a plurality of narrow parallel strips extending transversely to the length of the web material;

detecting the precise longitudinal location of said stripes along the moving web;

transversely creasing the moving web at predetermined locations relative to said strips of said bonding pattern to establish a pleat pattern on the web, said creases extending parallel to said adhesive bonding stripes, said creases being created by creasing elements whose registry with the moving web is continuously adjustable as the web passes thereby;

dynamically adjusting the registry of said creasing elements with the moving web while the web is being pleated, as required to continuously maintain said predetermined locations in response to said detecting step;

folding the coated and creased web along said transverse creases and upon itself in alternating opposite directions; and accumulating a stack of alternatingly directed pleats to form an array of tubular cells each extending transversely to the length of the web, with adjacent cells being joined together by said adhesive bonding strips.

10. The method of claim 9 wherein said folding and accumulating steps include the further steps of:

accumulating said stack in a batcher box; and evacuating air from the space between adjacent precreased and folded pleats by means of air withdrawal orifices located within said batcher box, to thereby enhance the compacting of said web stack in said batcher box.

11. The method of claim 9 wherein said folding and accumulating steps include the further steps of:

accumulating said stack in a batcher box with the first-formed portion of said stack being deposited onto a base which is movable along the length of said batcher box; and controlling the position of said movable base along the length of said batcher box in such a way that said base moves away from the web entry end of said batcher box as the length of said stack increases, to thereby maintain the newly added portion of said stack at said entry end of said batcher box as said folded web accumulates therein.

12. The method of claim 11 wherein said folding and accumulating steps include the further steps of:

evacuating air from the space between adjacent precreased and folded pleats by means of air withdrawal orifices located within said batcher box adjacent the web entry end, to thereby enhance the compacting of said web stack in said batcher box.

* * * * *